(12) United States Patent
Cooley et al.

(10) Patent No.: US 8,683,662 B2
(45) Date of Patent: Apr. 1, 2014

(54) PIERCING RIB CLIP

(75) Inventors: Brock T. Cooley, Bloomer, WI (US);
James T. Kirchen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 68 days.

(21) Appl. No.: 13/256,046

(22) PCT Filed: Feb. 17, 2010

(86) PCT No.: PCT/US2010/024398
§ 371 (c)(1),
(2), (4) Date: Sep. 12, 2011

(87) PCT Pub. No.: WO2010/104653
PCT Pub. Date: Sep. 16, 2010

(65) Prior Publication Data
US 2012/0272487 A1  Nov. 1, 2012

Related U.S. Application Data

(60) Provisional application No. 61/159,912, filed on Mar. 13, 2009.

(51) Int. Cl.
*F16B 5/06* (2006.01)
*F16B 5/12* (2006.01)

(52) U.S. Cl.
USPC .............................................. 24/297; 24/453

(58) Field of Classification Search
USPC ................................ 24/297, 453; 403/388
See application file for complete search history.

(56) References Cited

U.S. PATENT DOCUMENTS

| | | | |
|---|---|---|---|
| 3,491,972 A * | 1/1970 | Townshend | 248/71 |
| 6,074,150 A | 6/2000 | Shinozaki et al. | |
| 6,119,916 A | 9/2000 | Anderson et al. | |
| 6,405,413 B2 | 6/2002 | Ichimaru et al. | |
| 6,449,814 B1 | 9/2002 | Dinsmore et al. | |
| 6,796,006 B2 | 9/2004 | Hansen | |
| 7,231,696 B2 | 6/2007 | Asano et al. | |
| 7,356,886 B2 * | 4/2008 | Okada | 24/297 |
| 7,552,516 B2 * | 6/2009 | Okada et al. | 24/297 |
| 8,424,170 B2 * | 4/2013 | Reznar et al. | 24/297 |
| 2005/0155191 A1 | 7/2005 | Asano et al. | |

OTHER PUBLICATIONS

ISR for PCT/US2010/024398 dated Aug. 20, 2010.

* cited by examiner

*Primary Examiner* — Robert J Sandy
(74) *Attorney, Agent, or Firm* — Mark W. Croll; Paul F. Donovan

(57) ABSTRACT

A piercing rib clip has first and second legs defining a space for receiving a rib of a component held thereby and a piercing pin held by at least one of the legs piercing the rib held between the legs.

17 Claims, 4 Drawing Sheets

PIERCING RIB CLIP

CROSS-REFERENCE TO RELATED APPLICATIONS

The present application is national phase of PCT/US2010/024398 filed Feb. 17, 2010, and claims the benefits of U.S. Provisional Application Ser. No. 61/159,912 filed on Mar. 13, 2009.

FIELD OF THE INVENTION

The present invention relates generally to fastening or retaining clips used for completing blind connections between a first panel or component and a second panel or component, and, more particularly, to so called rib-clips used for attaching interior trim, or additional components, to another member in the interior or exterior of a vehicle.

BACKGROUND OF THE INVENTION

Connecting interior panels of automobiles to the metal framework of the automobile, or connecting trim or other components to the vehicle can involve the completion of so-called "blind" connections. Fasteners of different styles and configurations, often referred to as "clips", have been developed for completing blind connections in automobile assemblies as well as in other assemblies.

It is known to use a simple metal retaining clip having bendable spring-like legs to engage one component, with the structure of the clip further configured to engage a hole, aperture, channel, or other opening or formation in a second component. Barbs or other features on the metal legs can embed in a plastic or other rib to secure the metal clip in place. Such metal retaining clips have been used successfully to hold components together, and have been used commonly in the automobile industry.

A disadvantage of known metal clips is noise caused by metal to metal contact. Metal to metal contact can cause a buzz, squeak or rattle condition (referred to as "BSR"). Another disadvantage is that metal clips can wear through the paint or other surface finish as a vehicle vibrates and causes the clip to move. Metal fasteners also can rust or corrode. Metal treatments can be used to mitigate corrosion of metal fasteners. Typically, the clips are treated in a secondary process, further adding to the cost and complexity of the production and use of such fasteners. In severe applications, even treated metal fasteners can corrode, causing unsightly stains or even failure of the connection. A further disadvantage of known metal clips is that the design thereof often results in a moderately high insertion force required onto the plastic blade or rib.

The popularity of plastic rib clips has increased, with many new assemblies, including automobiles, implementing less expensive plastic versions of the popular metal clips that have had widespread popularity. Plastic clips can overcome some of the disadvantages of metal clips, including generation of BSR and other effects of vibrating metal clips. However, known plastic clips also have disadvantages. One disadvantage is that known plastic fasteners used as a blind fastener require a molded doghouse for attachment to the back of one panel or component. Forming a doghouse can be expensive and cause tooling to be complex. When used on a rib, the plastic fastener requires a hole molded or punched into the plastic blade or rib on which the part is mounted. The hole receives projections from the spring-like legs of the clip, to retain the clip on the plastic rib. This, too, adds to the complexity of manufacture and assembly of known ribs.

An improved plastic rib clip would provide advantages and overcome some known disadvantages of metal rib clips.

SUMMARY OF THE INVENTION

The present invention overcomes disadvantages of prior metal and plastic clips by providing a plastic rib clip having a piercing pin extending from one leg of the clip toward the other leg of the clip and piercing a rib on which the clip is installed.

An advantage of the piercing rib clip, in at least one form thereof, is that the clip can be made efficiently of plastic creating less expensive tooling for the components; and plastic molded components can have price advantages over the stamped, heat treated and surface treated metal fasteners known previously.

Another advantage of the piercing rib clip, in at least one foam thereof, is that the plastic clip fastener will reduce BSR issues that are known with metal fasteners, and can replace many current designs of blind fastening systems with a single, inexpensive part.

Still another advantage of the piercing rib clip, in at least one form thereof is that the fastening system does not require a window to be formed in the rib for the system to function properly.

Other features and advantages of the invention will become apparent to those skilled in the art upon review of the following detailed description, claims and drawings in which like numerals are used to designate like features.

Figure 1:
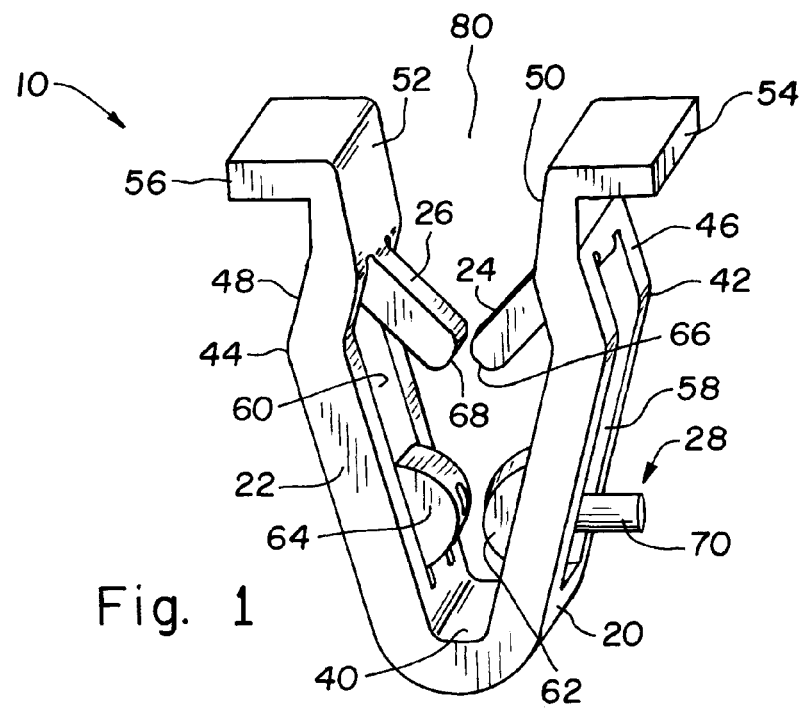
FIG. 1 is a perspective view of a piercing rib clip prior to installation.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
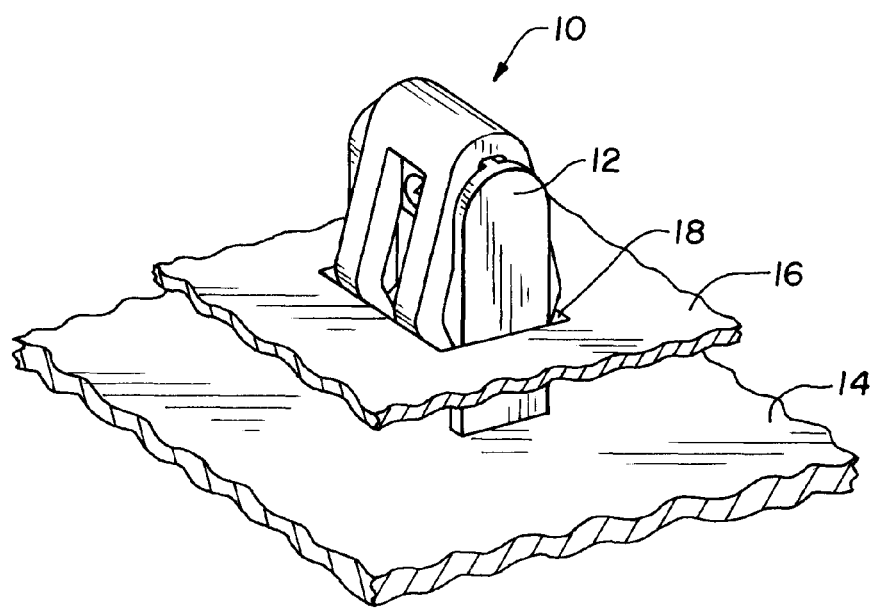
FIG. 2 is a perspective view of an exemplary installation using a piercing rib.

Referring now more specifically to the drawings and to FIGS. 1 & 2 in particular, a connecting, piercing rib clip 10 is shown, which can be installed onto a molded plastic rib 12 on a primary substrate or first component 14. The subassembly of first component 14 with rib clip 10 installed thereon then can be connected to a second component or substrate 16. The distal end of rib clip 10, with the rib clip being engaged on rib 12, is inserted through a slot 18 in secondary substrate 16. The subassembly is retained in secondary substrate 16 by the geometry of rib clip 10 interacting with the edge of slot 18, as those skilled in the art will readily understand. Accordingly, many different configurations for the size and shape of the rib clip can be used to cooperate with the sizes and shapes of the ribs and slots of the first and second components to achieve suitable installation and holding characteristics.

Piercing rib clip 10 can be made of various plastics by known molding processes, as those skilled in the art will readily understand. Material characteristics of the plastics used for piercing rib clip 10, including strength and resistance to environmental conditions, can be selected based on the intended use of the piercing rib clip. The use of molded plastic for piercing rib clip 10 removes many of the manufacturing and other disadvantages of known metal clips.

The exemplary embodiment of molded plastic piercing rib clip 10 includes two generally confronting or opposed legs 20, 22 having stabilizing features or arms 24, 26 thereon, and a piercing pin 28 extending from one leg 20 to the other leg 22. Piercing pin 28 may include a barb 30 at the inner end thereof to help retain piercing pin 28 in place on molded plastic rib 22.

In the exemplary embodiment shown for piercing rib clip 10, legs 20, 22 are connected to each other at a curved transition tip 40. From tip 40, legs 20, 22 angle generally outwardly away from one another to hips 42, 44 thereof, respectively. Each leg 20, 22 then angles inwardly from the respective hip 42, 44 along inwardly directed segments 46, 48. Confronting, spaced shoulders 50, 52 of legs 20, 22 are provided, with lateral flanges 54, 56 extending outwardly therefrom at the distal ends of legs 20, 22. Further, to promote desirable flexing of rib clip 10 during installation, legs 20, 22 define elongated windows 58, 60 respectively. Arms 24, 26 angle inwardly from distal ends of windows 58, 60 relative to transition tip 40, and pediments 62, 64 protrude inwardly from ends of windows 58, 60 proximal to transition tip 40.

Arms 24 and 26 are provided as additional stabilizing features for engaging opposite sides of rib 12 when piercing rib clip 10 is installed on rib 12. Accordingly, each is an angularly inwardly extending projection that, when considered from the connected at bases thereof to the distal tips thereof angle generally away from the opening between shoulders 50, 52 and toward transition tip 40. Accordingly, each arm 24 and 26 can be deflected as necessary by rib 12 as rib clip 10 is inserted thereon, and the arms provide biasing forces against opposite sides of the rib clip for stabilizing the clip on the rib. Distal ends 66, 68 of arms 24, 26, respectively, can be rounded or curved to promote sliding of piercing rib clip 10 onto rib 12 between arms 24, 26.

Piercing pin 28 in the exemplary embodiment includes an elongated shaft portion 70, and a sharpened piercing tip 72. Piercing pin 28 is received in a hole 74 of pediment 62 and is driven toward a hole 76 in pediment 64. In traversing from pediment 62 to pediment 64, piercing tip 72 punctures rib 12 such that shaft 70 extends through rib 12. Shaft portion 20 is of sufficient length so that piercing pin 28 extends from one leg 64 to the other leg 62.

Figure 3:
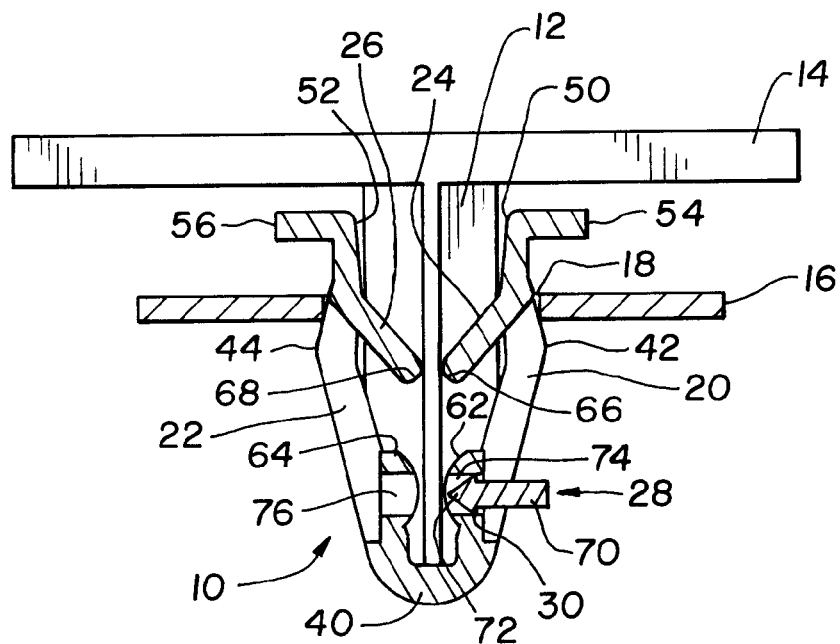
FIG. 3 is a cross-sectional view of the piercing rib clip in position on components but prior to a final installation step.
Figure 4:
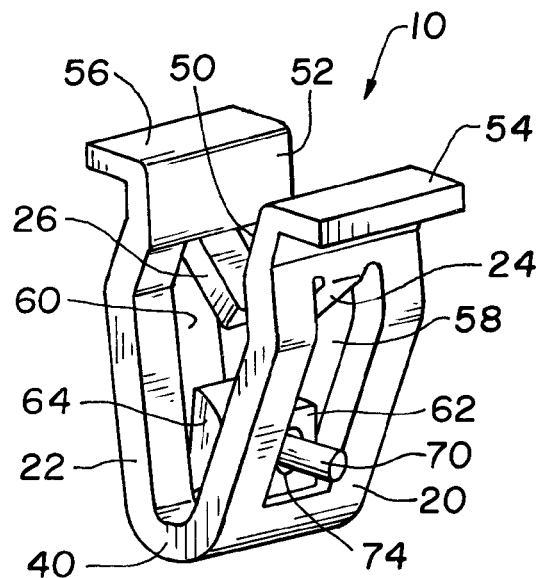
FIG. 4 is a perspective view of the piercing rib clip shown from an angle different from that of FIG. 1.
Figure 5:
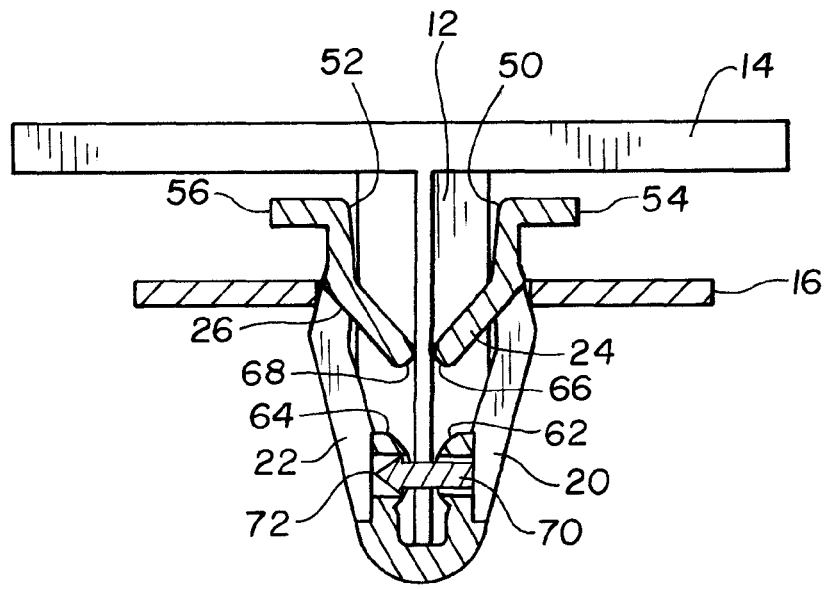
FIG. 5 is a cross-sectional view of a completed installation of the piercing rib clip shown in FIG. 3.
Figure 6:
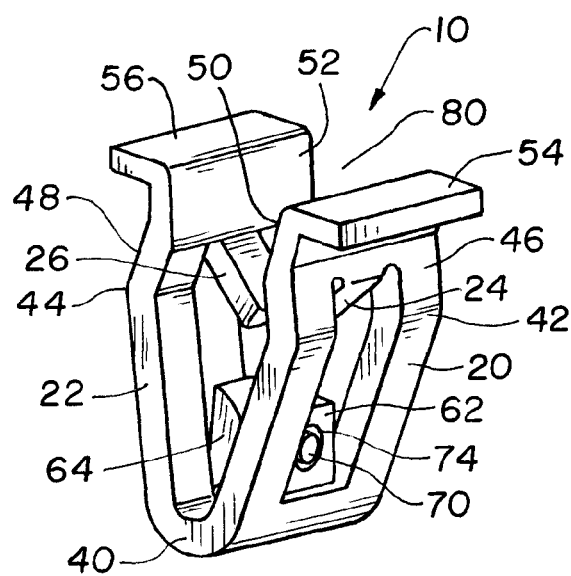
FIG. 6 is a perspective view of only the installed rib clip in the condition shown in FIG. 5, with other components of the installation removed for clarity purposes.
Figure 7:
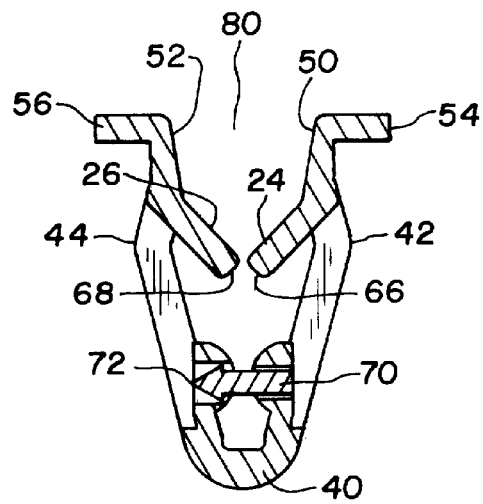
FIG. 7 is a cross-sectional view of the completely installed piercing rib clip in the condition shown in FIGS. 5 and 6, but with the other installation components not being shown for clarity.

Piercing pin 28 can be molded in an offset state or retracted position (FIG. 1) so as to not interfere with the initial installation of rib clip 10 on rib 12. After the molded plastic rib clip 10 is installed onto the molded plastic rib 12, and after the clip has reached the final position therefor on rib 12 (FIG. 3), piercing pin 28 is advanced from the retracted position and driven through rib 12. FIGS. 5, 6 and 7 illustrate piercing pin 28 driven to its final installed position. FIGS. 6 & 7 show assembled views without the rib being shown for clarification.

Piercing rib clip 10, as shown and described for the exemplary embodiment, defines a generally U-shaped body, with legs 20, 22 thereof defining a space 80 there between sufficient to receive rib 12 on which clip 10 is installed. Clip 10 is retained on rib 12 initially by the pinching action of arms 24, 26 on opposite sides of rib 12. For final installation, pin 28 is driven from pediment 62 to pediment 64 and pierces through rib 12.

Figure 8:
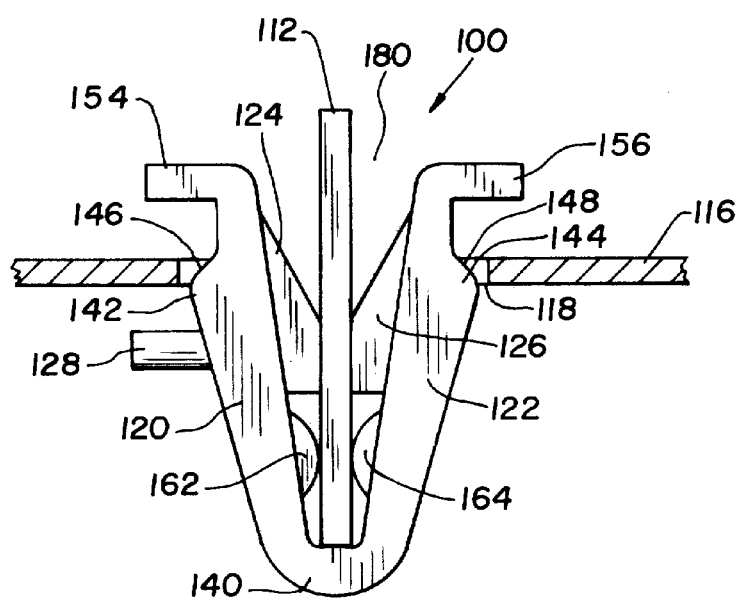
FIG. 8 is a perspective view of another embodiment for a piercing rib clip.

Another embodiment of a piercing rib clip 100 is shown in FIG. 8. Piercing rib clip 100 is similar to piercing rib clip 10 and includes legs 120, 122 that are similar to legs 20, 22 described previously herein. Legs 120, 122 are connected at a curved transition tip 140 and include hips 142, 144; inwardly directed segments 146, 148 and flanges 154, 156 similar to tip 40; hips 42, 44; segments 46, 48 and flanges 54, 56 described previously herein. Pediments 162, 164 can be provided similar to pediments 62, 64 but do not require holes 74, 76 therein respectively. Legs 120, 122 define a space 180 there between for receiving rib 112. As shown and described with respect to the exemplary embodiment, pediments 162, 164 confront and engage opposite sides of rib 112. Arms 124, 126 can be of more substantial construction than arms 24, 26 described previously herein. Arms 124, 126 support a piercing pin 128 that is similar in construction and operation to piercing pin 28. Placing piercing pin 128 in arms 124, 126 more distant from transition tip 140 and closer to the engagement of piercing rib clip 100 with second component 116 provides increased pullout resistance due to the geometric transfer of forces when second component 116 engages hips 142, 144 in a pullout sequence. Arms 124, 126 force legs 120, 122 outwardly against the slot 118 in second component 116. The resultant force opposes the extraction force, thereby increasing the retention features of clip 100. Accordingly, piercing rib clips as described herein can be configured to provide easy installation requiring minimal force while retaining high extraction force resistance in the completed assembly.

Figure 9:
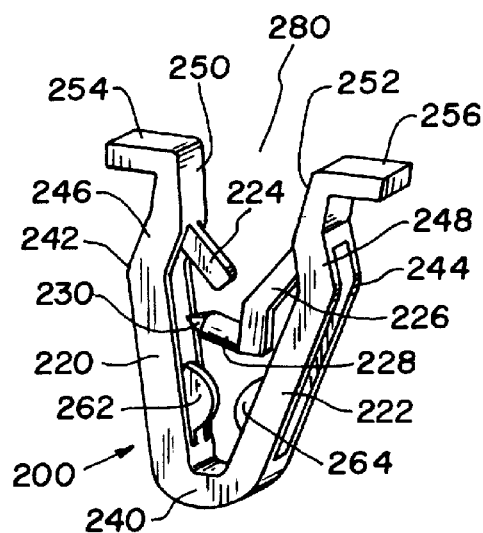
FIG. 9 is a perspective view of yet another embodiment for a piercing rib clip.

FIG. 9 illustrates still another embodiment for a piercing rib clip 200. Piercing rib clip 200 is similar in some structural features to piercing rib clip 10 and includes legs 220, 222 and one arm 224 that are similar to legs 20, 22 and arm 24 described previously herein. However, piercing rib clip 200 includes an arm 226 provided with an integral piercing pin 228, which may include one or more barb 230. Legs 220, 222 are connected in a transition tip 240 and include hips 242, 244; inwardly directed segments 246, 248; shoulders 250, 252 and flanges 254, 256 similar to tip 40; hips 42, 44; segments 46, 48; shoulders 50, 52 and flanges 54, 56 described previously herein. Pediments 262, 264 can be provided similar to pediments 62, 64 but do not require holes therein similar to holes 74, 76. A space 280 is defined between legs 220, 222. In the use of piercing rib clip 200, piercing pin 228 integral on arm 226 can be used to puncture a rib on which rib clip 200 is installed by bending arm 226 toward the rib.

The examples shown and described herein are only exemplary. Existing rib clips are known in a variety of sizes and shapes for installing different first components to different second components, some useful on plastic substrates and some useful on metal substrates. The concepts shown, described and claimed herein can be used on the other rib clip designs as well and are not limited to the specific rib clips shown herein.

Piercing rib clips of the present invention can be molded as a single component that can be snapped on to a thin plastic rib to provide an anchor point for an additional component to be attached to another base component. The piercing pin can be forced through a relatively thin rib and create a shear pin for securing the installation of the fastener. As the two components are assembled, legs of the rib clip flex such that the clip is allowed to pass through the slot to the base panel. When the primary panel is fully seated, the legs retained to the edge of the slot creating a final assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A connecting clip comprising:
   first and second legs connected to each other at one end of said clip and defining a space therebetween along the lengths of said legs sufficient for receiving a rib of a component for holding the clip; and
   a piercing pin molded to one of said legs such that said clip is molded as a single component in a substantially U-shaped configuration, said piercing pin being movable from said one of said legs toward the other of said legs, said pin being of sufficient length for spanning said space between said first and second legs, and said piercing pin positioned relative to said legs for piercing a rib positioned between said legs.

2. The connecting clip of claim 1, said piercing pin being slidably movably held by said one of said legs.

3. The connecting clip of claim 1, at least one of said legs having a pediment thereon, and a portion of said piercing pin being held in said pediment.

4. The connecting clip of claim 1, each of said legs having a pediment thereon, and portions of said piercing pin being held in each said pediment when the connecting clip is installed in an assembly.

5. The connecting clip of claim 1, one of said legs having a pediment thereon, said pediment having a hole therein, and said piercing pin being slidably held in said hole.

6. A connecting clip comprising:
   first and second legs connected to each other at one end of said clip and defining a space therebetween along the lengths of said legs sufficient for receiving a rib of a component for holding the clip;
   a piercing pin molded to one of said legs such that said clip is molded as a single component, said piercing pin being movable from said one of said legs toward the other of said legs, said pin being of sufficient length for spanning at least a portion of said space between said first and second legs, and said piercing pin positioned relative to said legs for piercing a rib positioned between said legs; and
   each of said legs having a pediment thereon, each said pediment having a hole therein, and said piercing pin being slidable from one of said holes to the other of said holes.

7. A connecting clip comprising:
   first and second legs connected to each other at one end of said clip and defining a space therebetween along the lengths of said legs sufficient for receiving a rib of a component for holding the clip;
   a piercing pin molded to one of said legs such that said clip is molded as a single component, said piercing pin being movable from said one of said legs toward the other of said legs, said pin being of sufficient length for spanning at least a portion of said space between said first and second legs, and said piercing pin positioned relative to said legs for piercing a rib positioned between said legs; and
   at least one of said legs having an arm extending into said space, and said piercing pin extending from said arm.

8. A connecting clip comprising:
   first and second legs connected to each other at one end of said clip and defining a space therebetween along the lengths of said legs sufficient for receiving a rib of a component for holding the clip;
   a piercing pin molded to one of said legs such that said clip is molded as a single component, said piercing pin being movable from said one of said legs toward the other of said legs, said pin being of sufficient length for spanning at least a portion of said space between said first and second legs, and said piercing pin positioned relative to said legs for piercing a rib positioned between said legs; and
   each of said legs having an arm extending into said space, and said piercing pin extending from said arm to the other said arm.

9. The connecting clip of claim 8, each of said legs having an arm and a protuberance extending into said space, said protuberance of each leg being between the arm of the leg and said one end of said clip, and said piercing pin extending from one said arm to the other said arm.

10. An assembly of a first component having a rib projecting therefrom and a second component defining a slot therein, said assembly comprising:
    a rib clip having a first leg and a second leg connected at one end by a transition tip, said first leg and said second leg having spaced distal ends on opposite sides of said rib;
    said clip being disposed in and engaging the slot of said second component; and
    a pin held by at least one said leg and piercing said rib, wherein one of said legs has a bendable arm, and said piercing pin projects from said arm.

11. An assembly of a first component having a rib projecting therefrom and a second component defining a slot therein, said assembly comprising:
    a rib clip having a first leg and a second leg connected at one end by a transition tip, said first leg and said second leg having spaced distal ends on opposite sides of said rib;
    said clip being disposed in and engaging the slot of said second component; and
    a pin held by at least one said leg and piercing said rib, said piercing pin being slidably movably held by said one of said legs, wherein
    each of said legs has a pediment thereon, and opposite ends of said piercing pin are held in said pediments.

12. An assembly of a first component having a rib projecting therefrom and a second component defining a slot therein, said assembly comprising:
a rib clip having a first leg and a second leg connected at one end by a transition tip, said first leg and said second leg having spaced distal ends on opposite sides of said rib;
said clip being disposed in and engaging the slot of said second component; and
a pin held by at least one said leg and piercing said rib, wherein
each of said legs has an arm and a protuberance extending into a space between said legs, said protuberance of each leg being between the arm of the leg and said one end of said clip, and said piercing pin extending from one said arm to the other said arm.

13. An assembly of a first component having a rib projecting therefrom and a second component defining a slot therein, said assembly comprising:
a rib clip having a first leg and a second leg connected at one end by a transition tip, said first leg and said second leg having spaced distal ends on opposite sides of said rib;
said clip being disposed in and engaging the slot of said second component; and
a pin held by at least one said leg and movable with respect to and independent of said at least one leg so as to pierce said rib, said piercing pin having a length sufficient for extending from one of said legs to the other of said legs.

14. An assembly of a first component having a rib projecting therefrom and a second component defining a slot therein, said assembly comprising:
a rib clip having a first leg and a second leg connected at one end by a transition tip, said first leg and said second leg having spaced distal ends on opposite sides of said rib;
said clip being disposed in and engaging the slot of said second component; and
a pin held by at least one said leg and piercing said rib, wherein
said legs have protuberances each having a hole therein, said holes being aligned with each other and separated by the rib, and said piercing pin extending through the rib and having opposite ends in said holes.

15. A connecting clip comprising:
first and second legs connected to each other at one end of said clip and defining a space therebetween along the lengths of said legs sufficient for receiving a rib of a component for holding the clip;
first and second arms projecting into said space from said first and second legs, respectively;
first and second protuberances projecting into said space from said first and second legs, respectively, said first protuberance being between said first arm and said one end of said clip and said second protuberance being between said second arm and said one end of said clip; and
a piercing pin held by one of said legs and being movable from said one of said legs toward the other of said legs, said pin being of sufficient length for spanning at least a portion of said space between said first and second legs, and said piercing pin positioned relative to said legs for piercing a rib positioned between said legs.

16. The connecting clip of claim 15, said piercing pin held in one of said pediments and having a length sufficient for extending across said space from said one of said pediments to the other of said pediments.

17. The connecting clip of claim 15, said piercing pin held in one of said arms and having a length sufficient for extending from said one of said arms to the other said arms across said space.

* * * * *